(12) United States Patent
Pilecek

(10) Patent No.: US 7,177,316 B1
(45) Date of Patent: Feb. 13, 2007

(54) METHODS AND DEVICES FOR PROVIDING LINKS TO EXPERTS

(75) Inventor: Kenneth C. Pilecek, Flemington, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/467,240

(22) Filed: Dec. 20, 1999

(51) Int. Cl.
*H04L 12/28* (2006.01)

(52) U.S. Cl. ............ 370/400; 379/265.12; 379/265.05; 379/265.01; 709/223; 709/200; 709/203

(58) Field of Classification Search ............ 370/236.1, 370/236.2, 262, 386, 389, 432, 503; 709/203, 709/202, 204, 217, 224, 218; 379/265.01–266.1
See application file for complete search history.

(56) References Cited

U.S. PATENT DOCUMENTS

| | | | |
|---|---|---|---|
| 6,080,202 A * | 6/2000 | Strickland et al. ............ 703/27 |
| 6,173,279 B1 * | 1/2001 | Levin et al. .................... 707/5 |
| 6,192,338 B1 * | 2/2001 | Haszto et al. ................ 704/257 |
| 6,219,793 B1 * | 4/2001 | Li et al. ....................... 713/202 |
| 6,226,666 B1 * | 5/2001 | Chang et al. ................ 709/202 |
| 6,327,363 B1 * | 12/2001 | Henderson et al. ..... 379/265.01 |
| 6,453,335 B1 * | 9/2002 | Kaufmann ................... 709/203 |
| 6,535,600 B1 * | 3/2003 | Fisher et al. ............ 379/265.12 |
| 6,553,113 B1 * | 4/2003 | Dhir et al. .............. 379/265.02 |
| 6,742,021 B1 * | 5/2004 | Halverson et al. ........... 709/218 |

OTHER PUBLICATIONS

Hummingbird Communications E-Mail.
Excalibur E-Mail.

* cited by examiner

*Primary Examiner*—Chi Pham
*Assistant Examiner*—Phuc Tran

(57) ABSTRACT

The best available expert is linked to a client in order to assist the client in understanding information obtained from computerized searches. The client and expert may be a part of the same or different networks. A resource matching program identifies and generates a concept from inquiries launched by the client. The concept is compared against an expert datasource which comprises data concerning the skills and knowledge of experts. This comparison, along with a set of availability rules, helps locate the best available expert. Once such an expert is located a link is established with the expert. The link may comprise a variety of communication methods including telephony, electronic mail, Internet, facsimile or wireless methods.

269 Claims, 2 Drawing Sheets

METHODS AND DEVICES FOR PROVIDING LINKS TO EXPERTS

BACKGROUND OF THE INVENTION

Increasingly, people are relying on computers instead of physical books to gather information. Those who are well versed and practiced in the art of computerized searches tout their ability to complete projects without referring to a single, physical book. Though such claims may be a bit overblown, there can be no doubt that the trend is towards using more, not less, computerized searches as a part of projects and investigations.

Finding information is only the beginning, however. Once the information is found it must be read and understood. Depending on the subject matter under investigation, the person doing the search may need help in understanding the information found. Most commonly, people rely on "experts" to help them understand information. Broadly speaking, an expert is someone who has knowledge related to a given subject matter. Usually, but not always, experts tend to have a high degree of specialized knowledge in a given subject. As used throughout the discussion which follows, the term expert will mean a person who has acquired knowledge in a particular subject through formal education, work experience or life's experiences. The subject areas of expertise are not in any way limited to scientific or technical areas. To the contrary, almost everyone has an expertise in a given subject, be it technical, financial, administrative or otherwise. Similarly, a group of people will have a number of fields of expertise.

People who form businesses or enterprises can be said to share a collective "enterprise or client expertise". All of the Web sites making up the Internet can be said to comprise publicly available (assuming the Web sites are open to the public) expertise.

Usually, if a person finds information and realizes she is in need of an expert, she will try to identify an expert using conventional means, such as by word-of-mouth, by reading physical expert directories, or by using companies who employ experts. As an alternative, experts can be identified electronically. There exists systems that purport to identify experts whose names reside in an electronic listing based on the concepts, context or content (collectively referred to hereafter as "concepts") of search inquiries. In other words, these systems purport to track the electronic inquiries completed by someone who is in the middle of an Internet search, for example, and then upon request, will identify the names of experts who can best help interpret the information obtained by the search. Ultimately, however, it is desirable to do more than just identify an expert or experts. What is desired is to link the expert with the person involved in the search (hereafter referred to as "client" or "clients") as fast as possible. Present systems and methods for identifying experts do not include ways to link identified experts to a client. The need to do so may sometimes be imperative. It may do no good to speak with an expert hours after he has been identified; if time is of the essence the expert must be contacted immediately by a client.

Accordingly, it is an object of the present invention to provide methods and devices which link clients to experts.

It is still another object of the invention to provide for methods and devices for linking clients to experts who are selected based on matching concepts inherent in computerized search inquiries with the skills and knowledge of available experts.

Other objectives, features and advantages of the present invention will become apparent to those skilled in the art from the following description taken in conjunction with the accompanying drawings.

SUMMARY OF THE INVENTION

In accordance with the present invention there are provided methods, electronic devices and computer readable mediums for linking at least one client with at least one expert. Most likely, but not always, the methods, devices and mediums for linking a client with an expert comprises a resource matching program for carrying out functions and features necessary to complete such a link.

Such a program comprises blocks of program code each of which is designed to carry out a function or functions which illustrate features of the present invention. More specifically, the present invention envisions program code adapted to generate at least one concept based on at least one client inquiry to at least one information datasource. The inquiries may be Internet based searches or other computerized searches whose aim it is to identify certain information. At some point the client completing the search realizes she is in need of an expert and launches a request to locate an expert to assist her in understanding the information she has identified. One of the first steps that needs to be done before an expert can be located is to derive a concept from the inquiries which have already been completed. This concept is generated by a resource matching program. After the concept is generated it is used by additional program code to compare the concept to at least one expert datasource. This expert datasource comprises a "topology of knowledge" of any number of experts. This topology includes the skills and knowledge of each expert, including but not limited to, an expert's work experience, educational background and other skills or knowledge the expert has acquired. The comparison generates a list of possible experts whose background matches the concept. From this list, one expert is selected based on a set of availability rules which are associated with the expert datasource. These rules help locate the expert who is not only qualified to assist the client, but also the one most readily available. Once the expert has been located, additional program code is adapted to link the at least one expert to at least one client.

The program code which links the client with the expert can be adapted to complete the link using a wide variety of communication protocols, such as a telephony, electronic mail, Internet, facsimile, data communications or a wireless protocol to name just a few.

The client and expert who are linked together may be a part of the same or different networks.

Thus, not only are experts located but a link is established between a client and the best available expert.

The present invention and its advantages can be best understood with reference to the drawings, detailed description of the invention and claims that follow.

DETAILED DESCRIPTION OF THE INVENTION

Figure 1:
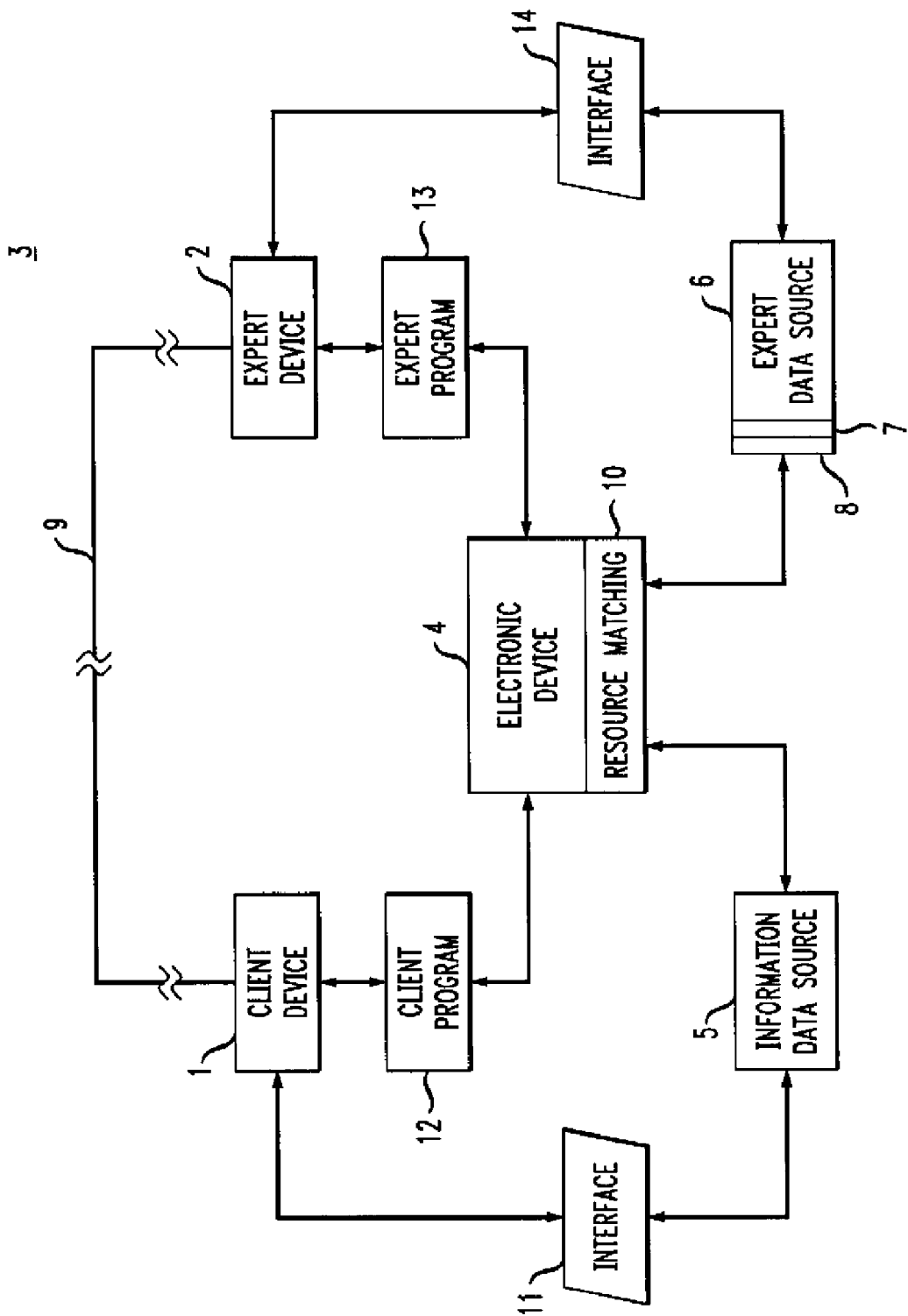
FIG. 1 shows a block diagram of a network comprising devices and programs adapted to link at least one client to at least one expert according to one embodiment of the present invention.

FIG. 1 shows one example of a network 3 which utilizes aspects of the present invention. The network 3 comprises a resource matching program 10, client device 1, expert device 2, information datasource 5 and expert datasource 6. In an illustrative embodiment of the invention, the program 10 may be a part of a larger electronic device 4. To simplify the explanation which follows, the network 3 will comprise a "client network" though this need not be the case. In reality the network 3 may comprise a public, private or client network. In general, a public network is a network which is fully accessible by the general public; a private network is a network which is accessible only by members of a private organization associated with the network but which also provides a link to a public network; while a client network is a highly restricted private network which may or may not have a link to a public network. The first two types of networks typically take the form of a wide area network ("WAN") while the last may be a local area network ("LAN") or a WAN. In addition, the explanation which follows will assume that both the client/client device 1 and expert/expert device 2 are a part of the same network 3. In alternative embodiments of the present invention, however, the client and expert as well as their respective devices may be a part of different networks. Said another way, the network 3 may comprise a public, private or client network or some combination of the three.

Figure 2:
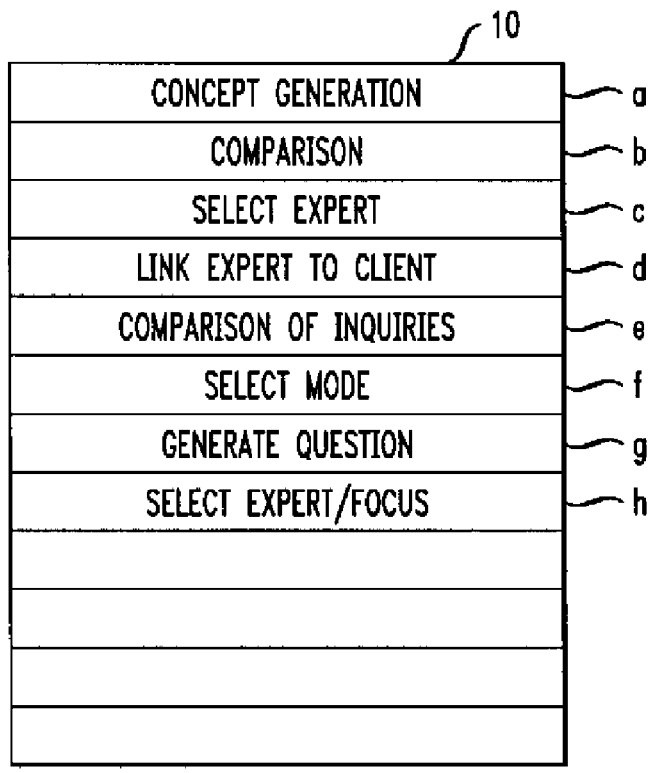
FIG. 2 shows a block diagram of a program and program code adapted to link at least one client to at least one expert according to one embodiment of the present invention.

In one embodiment of the present invention the linking of a client with an expert is carried out by program 10 in conjunction with the devices 1,2 and 4 and datasources 5,6. Referring to FIG. 2, the program 10 comprises program code 10a–i (where "i" is the last line of code) written in a form known in the art but adapted to link a client to an expert. For purposes of the explanation which follows, all of the program code 10a–i will be assumed to be a part of a single program 10 and single device 4. Alternatively, other embodiments of the present invention envision the program code 10a–i, program 10 and/or device 4 being separated further such that the program code may be a part of more than one program and/or more than one device. It should be understood, therefore, that where the words "program" or "electronic device" are used hereafter, these terms include both the singular and plural. It should also be understood that the program 10 may comprise either software or firmware and that some of the functions of the program 10 may be realized in hardware as well.

For present purposes, it will be assumed that the program 10 is realized completely as software/firmware. An example of how the program 10 functions to link at least one client to at least one expert is as follows.

A client begins by initiating a computerized search of the information datasource 5. The search is launched using some sort of client communications device 1. The device 1 will typically communicate with the datasource 5 using a variety of interfaces 11, including but not limited to, some sort of operating system, a graphical user interface, a modem or network interface, and perhaps even a browser or portal. Once the client's device 1 is connected to the information datasource 5 the client can launch a search to locate information within the datasource 5. A search may comprise a number of specific inquiries. As the client is launching inquiries against the datasource 5 these inquiries are also being monitored by device 4 and program 10. At some point the client comes to the realization that she needs help in understanding the information which has been presented to her in response to her inquiries. More specifically, she wishes to be linked to an expert so she may ask for help.

The client begins the process of becoming linked to an expert by launching a request directed at the program 10. This request informs the program 10 that the client wishes to be linked to an expert. In one embodiment of the invention, a client interaction/observer program 12 may be adapted to link the client to the resource matching program 10. In an illustrative embodiment of the invention this program 12 serves at least the following function: to monitor the inquiries launched against the datasource 5 and other data associated with a client's activity (e.g., so-called "click stream data"). Once a request is received by the program 10, program code 10a is selected and adapted to generate at least one concept based on at least one client inquiry which had been launched against the datasource 5. It should be understood that the concept generated by the program 10 may be based on any number of inquiries from any number of datasources. For ease-of-explanation only a single datasource 5 and a single client inquiry have been referred to above.

In an illustrative embodiment of the invention, once a concept has been generated, the program 10 is then adapted to select program code 10b which is adapted to compare the at least one generated concept to the expert datasource 6. The purpose behind this comparison is to, as closely as possible, match the generated concept to at least one expert. The expert datasource 6 will typically comprise a database which is made up of information about experts. For instance, the database may comprise information about the education, work experience and accomplishments of a given expert. In addition, the database may contain information related to skills and knowledge an expert may have which may not be apparent from an expert's education, work experience or accomplishments. For example, an expert may have completed a project which required her to assimilate expertise in more than one subject area. A simple listing of the project might be insufficient to highlight the areas of expertise which were learned. Thus, the database 6 would include a total "topology of knowledge" for a given expert.

Continuing, once the program 10 has completed a comparison of the generated concept and the expert datasource 6, the program 10 is then adapted to select program code 10c. Program code 10c is adapted to select at least one expert from the expert datasource 6 based on the comparison of the generated concept to the expert datasource 6. As before, though only a single expert and expert datasource 6 are used in the example above, it should be realized that any number of experts and expert datasources may be selected and/or utilized. Said another way, at least one expert must be selected from at least one expert datasource by program code 10c but there is no corresponding upper limit on the number of experts or expert datasources.

By selecting an "expert" is meant that the program code 10c is adapted to execute a set of instructions for locating the information (e.g., records in a database) within datasource 6 which is associated with the most qualified expert for a given concept. After this information is located, the program 10 is then adapted to select program code 10d. Program code 10d is adapted to link the selected expert with the client (or vice-versa) who initiated the request. In alternative embodiments of the invention, the expert may be linked to a client other than the one who initiated the request and the program 10 would be adapted to complete such a link.

In the beginning of the example above, it was assumed that the client launched an inquiry against the information datasource 5 using means other than resource matching program 10. In an alternative embodiment of the invention, this function may be included within program 10. Thus, program 10 may comprise program code 10e adapted to compare at least one client inquiry to the information datasource 5.

The program 10 may perform other functions in addition to the ones outlined above. Before discussing additional functions, however, some additional aspects of the present invention related to the functions already outlined above will be discussed. The link 9 established between the client and expert may use a variety of communication schemes and methods. To this end, program code 10d may further comprise program code for linking the client to the expert using a telephony, electronic mail, Internet, facsimile, data communications, or a wireless protocol to give just a few examples. More specifically, program code 10d may comprise program code which links the client and expert using a protocol selected from a group of protocols, such as: POTS, ISDN, voice over Internet, ATM, and frame relay (telephony protocols); SMTP, SMTP/MIME, SMTP/PMSP and SNMP (electronic mail protocols); TCP/IP, military standard TCP/IP, point-to-point, and point-to-point tunneling (Internet protocols); CCITTG3FAX, CCITTG4FAX, v.27ter, v.29, v.17, ITU-T, T.30, ITU-T, T.4, ITU-T, T.6, Kermit, and K56flex (facsimile protocols); Ethernet, token ring, IBM-SNA-3270, IBM-SNA-5250, HDLC, BiSync, and RS232 (data communications protocols); or AMPS, TDMA, CDMA, composite CDMA/TDMA, CDPD, GSM (European tandard) and PCS (wireless protocols). Besides these recognized protocols there exist other protocols which have been developed by various standard-setting groups within each segment of the communications industry. The present invention envisions embodiments where the program 10 comprises program code 10d for linking the client and expert using at least the following protocols developed by such groups: Open Systems Interconnect ("OSI") electronic messaging CCITT X.400 standard; OSI electronic messaging CCITT X.500 standard; OSI electronic messaging CCITT X.700 standard (electronic mail protocols); Internet Architecture Board, RFC2300 standard (Internet protocol); Internet mail protocols, including but not limited to, those defined by RFC 2305 or by a MIME part, RFC 2159 standard (facsimile protocols); modem protocols, including but not limited to, those defined by v.21, v.22, v.22bis, v.23, v.25 and v.34 standards (data communication protocols).

One of the things which was initially discussed was the type of network or networks which may make up network 3 and the fact that the client device 1 and expert device 2 may or may not be a part of the same type of network. The same is true for the information datasource 5 and expert datasource 6. Though the examples above assumed that both datasources 5,6 were part of the same type of network this need not be the case. In alternative embodiments of the present invention, the datasources 5,6 may be part of the same or different networks. The type of network may comprise a public, private or client network.

In the case where the client device 1, expert device 2, or either of the two datasources 5,6 are a part of a public network it should be understood that a portion of such a public network may comprise the Internet, private networks (e.g., intranets) or links to private networks using passwords or the like (e.g., extranets).

As indicated above, program code 10d is adapted to link the client with the selected expert. In an illustrative embodiment of the invention the program code 10d is further adapted to link at least one device 2 of the selected expert to at least one client device 1. Though normally the client device and expert device would comprise the same type of device, this need not be the case. The present invention envisions embodiments where the client and expert devices 1,2 comprise the same type of device or a different type of device. For example, the client and/or expert devices 1,2 may comprise: a computer terminal, a wireless device, an infrared wireless device, an optical signaling wireless device, a telephone, a softphone, a facsimile machine, a facsimile server, a programmable PC card, or a personal communications device such as a communications pager adapted to display alpha-numeric characters.

As the discussion above indicates, a variety of protocols and client/expert devices may be used to carry out aspects of the present invention. The program 10 may also be a part of a variety of different electronic devices. Electronic device 4 may comprise: a public, private or client network server; a communications server, such as a server selected from the group consisting of a PBX, ACD, soft ACD, Centrex and central office switch; a router or Internet protocol ("IP") router; or an Internet Call Center to name just a few examples.

The program 10 and electronic device 4 may be adapted to carry out additional functions which will now be briefly outlined. Many times an expert selected by program 10 and or device 4 may be contacted in more than one way, by phone, fax or e-mail, for example. Such an expert may nonetheless prefer that clients contact her using a preferred communication mode or means. The present invention provides for such circumstances. In an illustrative embodiment of the invention, the program 10 comprises program code 10f which is adapted to select at least one preferred communication mode associated with the selected expert and is further adapted to link the client device 1 with the expert device 2 using the preferred communication mode.

Figure 3:
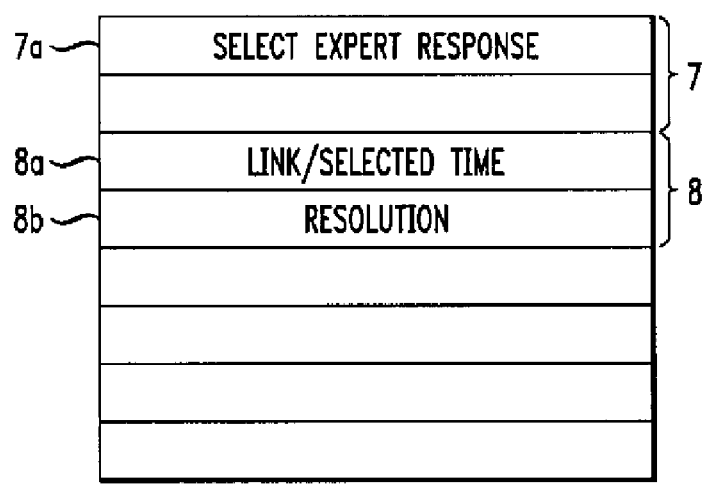
FIG. 3 shows a block diagram of additional programs and program code adapted to link at least one client to at least one expert according to one embodiment of the present invention.

Depending on the number of clients which belong to the network 3, there may be a number of client inquiries which are very similar. Those clients who are used to Internet searches recognize the abbreviation "FAQ" which stands for "frequently asked questions". The present invention recognizes that it might be onerous for a single expert to be continuously linked to different clients who are all seeking answers to the same question. To provide for such an event, an alternative embodiment of the invention envisions a program 7 which comprises program code 7a shown in FIG. 3 adapted to select at least one, predetermined expert response. One explanation of this feature of the present invention is as follows. After the program 10 has generated a concept from a client's inquiry or inquiries, the program 7 is then adapted to compare this concept to a list of stored, frequently sought after concepts. If there is a match then the program 7 is further adapted to select a predetermined response and forward this response to the client. This frees up the expert to respond to other, less frequently asked questions based on less frequently sought after concepts.

It is a goal of the present invention to link the client with the most qualified and available expert. The issue of availability will be discussed shortly, for now we turn to the issue of locating the most qualified expert. As outlined above the electronic device 4 or program 10 generates a concept based on client inquiries. In general, the more inquiries launched by a client the easier it is to generate a relevant, focused concept. The more focused the concept the better the chances of locating the correct expert. The present invention envisions the capability of focusing the generated concept in order to insure that the concept is relevant to the client's inquiry or inquiries. For example, after a first concept has been generated based on only one or a few client inquiries, the device 4 or program 10 comprising program code 10g can be adapted to generate at least one question aimed at the client (hereafter a "client question"). This client question might take the form of: "Is this the concept you are interested in?". The program 10 and program code 10g can be similarly adapted to send the client question to the client device 1. At this time the client can then send a response back to the program 10. This process may be repeated until the concept has been sufficiently focused. The focused concept is then used to select an expert. In an alternative embodiment of the invention, the program 10 comprises program code 10h adapted to select or locate an expert from datasource 6 based on the focused concept.

So far the discussion above has presumed that a selected expert is sitting behind her desk waiting to be contacted by a client. This is unrealistic. Experts may only be available during certain times of the day, on certain days or only under certain circumstances (e.g., life-threatening emergencies). To this end, the present invention envisions an availability program 8 adapted to link the client to an expert based on availability rules stored in the program 8 or accessible to the program 8. By way of example, program code 8a can be adapted to link the client device 1 to the expert device 2 beginning at a time selected by the expert, and not before.

The availability rules can be stored as a part of datasource 6. Referring back to FIG. 1, program 8 may in fact comprise both hardware and software (or firmware); the software comprises the program code making up program 8 while the hardware comprises memory devices and the like for storing availability data, e.g., rules. Another example of an availability rule is one which governs which experts may or may not participate (i.e. are included in, or accessible within, datasource 6). The program 8 may comprise a scheduling program adapted to work with program 10, device 4, datasource 6 and expert device 2.

The availability rules may also be used to resolve conflicts which arise when the resource matching program 10 locates more than one expert who matches a generated concept. In this event, the present invention envisions program code 8b which is adapted to resolve such conflicts using a variety of criteria. The program code 8b may be adapted to resolve such conflicts based on criteria which determines which of the experts is "most currently available", or "most easily reachable", or based on other criteria such as the cost, if any, of consulting such an expert, or the expert's location or distance from the client to name just a few examples. In an illustrative embodiment the program code 8b is a part of the availability program 8.

More can be said about the datasources 5,6. Expert datasource 6 at a minimum comprises data related to experts and expert devices. This data may comprise an entire topology of knowledge and more particularly, comprises data related to the skills and knowledge of experts. It should be understood that the experts may be those who work for the client or are a part of the same company or network as the client. These experts can be referred to as client experts. Those experts which are not associated with the client can simply be referred to as experts. Said another way, the datasource 6 may comprise a database of experts who are employed by, or work for, the clients. When the program 10 compares a generated concept against the expert datasource 6, it is comparing the concept against the experts' skills and knowledge. Thus, when the program 10 locates an expert device it may in fact be locating a device associated with an expert who works for the same company as the client. So it is understood, the datasource 6, experts and expert devices are not limited to those of the clients'; this is just one scenario envisioned by the present invention.

Turning to the information datasource 5, this datasource may comprise both structured and unstructured data; the present invention will work with either or a combination of both types of data.

There exists a number of ways to generate concepts. In general, the generation of a concept may also comprise and involve more sophisticated techniques, such as pattern matching, parallel processing or neural network based processes.

FIG. 1 also shows the client interaction/observer program 12 and an expert interaction/observer program 13. Broadly speaking, the client program 12 comprises program code which is adapted to track the inquiries launched by the client and to assist the resource matching program 10 in the generation of a concept. The expert program 13 comprises program code which is adapted to, broadly speaking, provide updated expert data (e.g., skills and knowledge updates) to the expert datasource 6 and to assist the resource matching program 10 in the selection of an expert using a generated concept via interface 14 which may be similar to interface 11.

The programs 7,8, 12 and 13 are shown as separate from the resource matching program 10. The present invention, however, is not so limited. All of the programs may be combined into a single resource matching program and may reside on the electronic device 4. Alternatively, the programs 7,8, 12, 13 and even 10 may be combined into a single program which, however, resides on more than one device; part may reside on a client device, part on an electronic device, and still other parts on an expert device and/or a datasource. Further, the present invention envisions alternative embodiments where the programs 7,8,12,13 and 10 are further broken down into additional programs. The exact number of programs and where they each reside is not critical to the present invention as long as all of the functions described above are carried out by some resource matching device/program. It should be understood that the program code 7a, 8a, 8b and 10a–h will usually comprise blocks of code instead of a single line of code.

To reiterate, the above discussion is given as examples of the present invention. It would be impractical, and perhaps impossible, to detail all of the possible embodiments of the present invention. For example, other digital and analog protocols may be used to link the client and expert together. Time-domain, multiplexed protocols (analog) and DCIU protocols (digital) are some further examples of protocols which may be used. However, it would be a daunting task to list a complete listing of all the protocols which could be used to carry out the present invention.

The programs discussed above have been assumed to be resident on the devices making up network 3 or electronic device 4 prior to the installation of the devices. This need not be. In still other alternative embodiments of the invention the programs are a part of a computer readable medium, such as a magnetic media storage device (e.g., floppy disks, hard drives or tape), an optical storage device (CDs, DVDs), another type of storage device (RAM, ROM, PROM, EEPROM, DSPs, microprocessors) which are then loaded into or otherwise made a part of device 4 (or other devices mentioned above) or the programs may also be downloaded using applets or the like. Taken together all of these devices may be referred to as electronic storage devices. Though the above discussion has focused on a program resident in a network, on an electronic device or on a computer readable memory it should be understood that the present invention also envisions complementary methods for carrying out the functions and features of the invention illustrated above.

It is to be understood that changes and variations may be made without departing from the spirit and scope of this invention as defined by the claims that follow.

I claim:

1. A method for linking at least one client with at least one expert comprising:
   generating at least one concept based on at least one client inquiry to at least one datasource;
   comparing the at least one generated concept to at least one expert datasource;
   selecting at least one expert from the at least one expert datasource based on the comparison of the generated concept to the at least one expert datasource; and
   linking the at least one expert to at least one client;
   wherein the at least one client inquiry comprises at least one client inquiry entered in conjunction with a computerized search conducted by the client;
   wherein the at least one client inquiry is monitored by a first program; and
   wherein the first program responsive to entry of a command by the client supplies information regarding the monitored at least one client inquiry to a second program and initiates performance of at least one of the generating, comparing, selecting and linking steps by the second program based on the monitored at least one client inquiry.

2. The method as in claim 1 further comprising comparing the at least one client inquiry to the at least one datasource.

3. The method as in claim 1 further comprising selecting at least one preferred communication mode associated with the at least one expert.

4. The method as in claim 1 further comprising selecting the at least one expert based on a set of availability rules.

5. The method as in claim 4 wherein the availability rules comprise rules selected from the group consisting of a most currently available expert, a most easily reachable expert, cost and location.

6. The method as in claim 1 further comprising linking at least one client device to at least one expert device associated with the at least one expert.

7. The method as in claim 6 further comprising linking the at least one client device to the at least one expert device using a preferred communication mode.

8. The method as in claim 6 wherein the at least one client device comprises a computer terminal.

9. The method as in claim 6 wherein the at least one client device comprises a wireless device.

10. The method as in claim 9 wherein the wireless device comprises an infrared wireless device.

11. The method as in claim 9 wherein the wireless device comprises an optical signaling, wireless device.

12. The method as in claim 6 wherein the at least one client device comprises a telephone.

13. The method as in claim 6 wherein the at least one client device comprises a softphone.

14. The method as in claim 6 wherein the at least one client device comprises a facsimile machine.

15. The method as in claim 6 wherein the at least one client device comprises a facsimile server.

16. The method as in claim 6 wherein the at least one client device comprises a programmable PC card.

17. The method as in claim 6 wherein the at least one client device comprises a personal communications device.

18. The method as in claim 17 wherein the personal communications device comprises a communications pager adapted to display alpha-numeric characters.

19. The method as in claim 6 wherein the at least one expert device comprises a computer terminal.

20. The method as in claim 6 wherein the at least one expert device comprises a wireless device.

21. The method as in claim 20 wherein the wireless device comprises an infrared wireless device.

22. The method as in claim 20 wherein the wireless device comprises an optical signaling, wireless device.

23. The method as in claim 6 wherein the at least one expert device comprises a telephone.

24. The method as in claim 6 wherein the at least one expert device comprises a softphone.

25. The method as in claim 6 wherein the at least one expert device comprises a facsimile machine.

26. The method as in claim 6 wherein the at least one expert device comprises a facsimile server.

27. The method as in claim 6 wherein the at least one expert device comprises a programmable PC card.

28. The method as in claim 6 wherein the at least one expert device comprises a personal communications device.

29. The method as in claim 28 wherein the personal communications device comprises a communications pager adapted to display alpha-numeric characters.

30. The method as in claim 1 wherein generating the at least one client concept comprises parallel processing.

31. The method as in claim 1 wherein generating at least one concept comprises pattern matching.

32. The method as in claim 1 wherein generating at least one concept comprises neural network processing.

33. The method as in claim 1 wherein the at least one datasource comprises structured and unstructured data.

34. The method as in claim 1 wherein the at least one datasource comprises structured or unstructured data.

35. The method as in claim 1 wherein the at least one expert datasource comprises data related to skills and knowledge of experts.

36. The method as in claim 1 wherein the at least one expert datasource comprises data related to expert devices.

37. The method as in claim 1 further comprising selecting at least one predetermined expert response based on a comparison of the generated concept to a list of frequently sought after concepts.

38. The method as in claim 1 further comprising updating the at least one expert datasource.

39. The method as in claim 38 further comprising updating skills and knowledge of experts in the at least one expert datasource.

40. The method as in claim 1 further comprising selecting the at least one expert based on a comparison of the generated concept to skills and knowledge of experts in the at least one expert datasource.

41. The method as in claim 1 wherein the at least one expert datasource comprises at least one client expert datasource.

42. The method as in claim 41 wherein the at least one client expert datasource comprises data related to skills and knowledge of client experts.

43. The method as in claim 41 wherein the at least one client expert datasource comprises data related to client expert devices.

44. The method as in claim 42 further comprising selecting the at least one expert based on a comparison of the generated concept to the skills and knowledge of the client experts.

45. The method as in claim 1 wherein the at least one expert comprises a client expert.

46. The method as in claim 6 further comprising linking the at least one client device to the at least one expert device using a telephony protocol.

47. The method as in claim 46 wherein the telephony protocol comprises a protocol selected from the group consisting of POTS, ISDN, voice over Internet, ATM, frame relay, an analog protocol and a digital protocol.

48. The method as in claim 47 wherein the analog protocol comprises a time domain multiplexed protocol.

49. The method as in claim 47 wherein the digital protocol comprises a DCIU protocol.

50. The method as in claim 6 further comprising linking the at least one client device to the at least one expert device using an electronic mail protocol.

51. The method as in claim 50 wherein the electronic mail protocol comprises a protocol selected from the group consisting of SMTP, SMTP/MIME, SMTP/PMSP, and SNMP.

52. The method as in claim 50 wherein the electronic mail protocol comprises a protocol determined by an Open Systems Interconnect electronic messaging CCITT X.400 standard.

53. The method as in claim 50 wherein the electronic mail protocol comprises a protocol determined by an Open Systems Interconnect electronic messaging CCITT X.500 standard.

54. The method as in claim 50 wherein the electronic mail protocol comprises a protocol determined by an Open Systems Interconnect electronic messaging CCITT X.700 standard.

55. The method as in claim 6 further comprising linking the at least one client device to the at least one expert device using an Internet protocol.

56. The method as in claim 55 wherein the Internet protocol comprises a protocol selected from the group consisting of TCP/IP, point-to-point, point-to-point tunneling and military standard TCP/IP.

57. The method as in claim 55 wherein the Internet protocol comprises a protocol defined by the Internet Architecture Board, RFC2300.

58. The method as in claim 6 further comprising linking the at least one client device to the at least one expert device using a facsimile protocol.

59. The method as in claim 58 wherein the facsimile protocol comprises a protocol selected from the group consisting of CCITTG3FAX, CCITTG4FAX, v.27ter, v.29, v.17, ITU-T, T.30, ITU-T, T.4, ITU-T, T.6, Kermit, and K56flex.

60. The method as in claim 58 wherein the facsimile protocol comprises an Internet mail protocol.

61. The method as in claim 60 wherein the Internet mail protocol comprises a protocol defined by a RFC 2305 standard.

62. The method as in claim 58 wherein the facsimile protocol comprises a protocol defined by a MIME part, RFC 2159 standard, relating to facsimile.

63. The method as in claim 6 further comprising linking the at least one client device to the at least one expert device using a data communications protocol.

64. The method as in claim 63 wherein the data communications protocol comprises a protocol selected from the group consisting of Ethernet, token ring, IBM-SNA-3270, IBM-SNA-5250, HDLC, BiSync, and an RS232 protocol.

65. The method as in claim 63 wherein the data communications protocol comprises a modem protocol.

66. The method as in claim 65 wherein the modem protocol comprises a protocol selected from a group consisting of v.21, v.22, v.22bis, v.23, v.25 and v.34.

67. The method as in claim 6 further comprising linking the at least one client device to the at least one expert device using a wireless communication protocol.

68. The method as in claim 67 wherein the wireless protocol comprises a communication protocol selected from a group consisting of AMPS, TDMA, CDMA, composite CDMA/TDMA, CDPD, GMS, and PCS.

69. The method as in claim 6 further comprising linking the at least one client device to the at least one expert device beginning at a selected time.

70. The method as in claim 1 wherein the at least one datasource and at least one expert datasource are part of the same network.

71. The method as in claim 70 wherein the network comprises a client network.

72. The method as in claim 70 wherein the network comprises a private network.

73. The method as in claim 70 wherein the network comprises a public network.

74. The method as in claim 73 wherein a portion of the public network comprises a network selected from a group consisting of the Internet, an intranet or extranet.

75. The method as in claim 1 wherein a portion of the at least one datasource and at the least one expert datasource are part of different networks.

76. The method as in claim 6 wherein the at least one client device and the at least one expert device are part of the same network.

77. The method as in claim 76 wherein the network comprises a client network.

78. The method as in claim 76 wherein the network comprises a private network.

79. The method as in claim 76 wherein the network comprises a public network.

80. The method as in claim 79 wherein a portion of the public network comprises a network selected from a group consisting of the Internet, an intranet or extranet.

81. The method as in claim 6 wherein the at least one client device and the at least one expert device are part of different networks.

82. The method as in claim 1 further comprising generating at least one client question.

83. The method as in claim 82 further comprising sending the at least one client question to the at least one client.

84. The method as in claim 83 further comprising selecting the at least one expert based on a focused concept derived from at least one client response to the at least one client question.

85. The method as in claim 1 further comprising tracking the at least one client inquiry.

86. The method as in claim 1 further comprising updating the at least one expert datasource.

87. A computer readable medium comprising a resource matching program adapted to link at least one client to at least one expert, the program comprising:
 program code adapted to generate at least one concept based on at least one client inquiry to at least one datasource;
 program code adapted to compare the at least one generated concept to at least one expert datasource;

program code adapted to select at least one expert from the at least one expert datasource based on the comparison of the generated concept to the at least one expert datasource; and program code adapted to link the at least one expert to at least one client;

wherein the at least one client inquiry comprises at least one client inquiry entered in conjunction with a computerized search conducted by the client;

wherein the at least one client inquiry is monitored by an additional program separate from the resource matching program; and wherein the additional program responsive to entry of a command by the client supplies information regarding the monitored at least one client inquiry to said resource matching program.

88. The computer readable medium as in claim 87 further comprising program code adapted to compare the at least one client inquiry to the at least one datasource.

89. The computer readable medium as in claim 87 further comprising program code adapted to select at least one preferred communication mode associated with the at least one expert.

90. The computer readable medium as in claim 87 further comprising program code adapted to link at least one client device to at least one expert device associated with the at least one expert.

91. The computer readable medium as in claim 90 further comprising program code adapted to link the at least one client device to the at least one expert device using a preferred communication mode.

92. The computer readable medium as in claim 87 further comprising program code adapted to select the at least one expert based on a set of availability rules.

93. The computer readable medium as in claim 92 wherein the availability rules comprise rules selected from the group consisting of a most currently available expert, a most easily reachable expert, cost and location.

94. The computer readable medium as in claim 87 wherein the medium comprises a magnetic storage device.

95. The computer readable medium as in claim 87 wherein the medium comprises an optical storage device.

96. The computer readable medium as in claim 87 wherein the medium comprises an electronic storage device.

97. The computer readable medium as in claim 90 wherein the at least one client device comprises a computer terminal.

98. The computer readable medium as in claim 90 wherein the at least one client device comprises a wireless device.

99. The computer readable medium as in claim 98 wherein the wireless device comprises an infrared wireless device.

100. The computer readable medium as in claim 98 wherein the wireless device comprises an optical signaling, wireless device.

101. The computer readable medium as in claim 90 wherein the at least one client device comprises a telephone.

102. The computer readable medium as in claim 90 wherein the at least one client device comprises a softphone.

103. The computer readable medium as in claim 90 wherein the at least one client device comprises a facsimile machine.

104. The computer readable medium as in claim 90 wherein the at least one client device comprises a facsimile server.

105. The computer readable medium as in claim 90 wherein the at least one client device comprises a programmable PC card.

106. The computer readable medium as in claim 90 wherein the at least one client device comprises a personal communications device.

107. The computer readable medium as in claim 106 wherein the personal communications device comprises a communications pager adapted to display alpha-numeric characters.

108. The computer readable medium as in claim 90 wherein the at least one expert device comprises a computer terminal.

109. The computer readable medium as in claim 90 wherein the at least one expert device comprises a wireless device.

110. The computer readable medium as in claim 109 wherein the wireless device comprises an infrared wireless device.

111. The computer readable medium as in claim 109 wherein the wireless device comprises an optical signaling, wireless device.

112. The computer readable medium as in claim 90 wherein the at least one expert device comprises a telephone.

113. The computer readable medium as in claim 90 wherein the at least one expert device comprises a softphone.

114. The computer readable medium as in claim 90 wherein the at least one expert device comprises a facsimile machine.

115. The computer readable medium as in claim 90 wherein the at least one expert device comprises a facsimile server.

116. The computer readable medium as in claim 90 wherein the at least one expert device comprises a programmable PC card.

117. The computer readable medium as in claim 90 wherein the at least one expert device comprises a personal communications device.

118. The computer readable medium as in claim 117 wherein the personal communications device comprises a communications pager adapted to display alpha-numeric characters.

119. The computer readable medium as in claim 87 wherein the program code for generating the at least one concept comprises program code adapted to complete parallel processing.

120. The computer readable medium as in claim 87 wherein the program code for generating the at least one concept comprises program code adapted to complete pattern matching.

121. The computer readable medium as in claim 87 wherein the program code for generating the at least one concept comprises program code adapted to complete neural network processing.

122. The computer readable medium as in claim 87 wherein the at least one datasource comprises structured and unstructured data.

123. The computer readable medium as in claim 87 wherein the at least one datasource comprises structured or unstructured data.

124. The computer readable medium as in claim 87 wherein the at least one expert datasource comprises data related to skills and knowledge of experts.

125. The computer readable medium as in claim 87 wherein the at least one expert datasource comprises data related to expert devices.

126. The computer readable medium as in claim 87 further comprising program code adapted to select at least one predetermined expert response based on a comparison of the generated concept to a list of frequently sought after concepts.

127. The computer readable medium as in claim 87 further comprising program code adapted to update the at least one expert datasource.

128. The computer readable medium as in claim 127 further comprising program code adapted to update skills and knowledge of experts in the at least one expert datasource.

129. The computer readable medium as in claim 87 further comprising program code adapted to select the at least one expert based on a comparison of the generated concept to skills and knowledge of experts in the at least one expert datasource.

130. The computer readable medium as in claim 87 wherein the at least one expert datasource comprises at least one client expert datasource.

131. The computer readable medium as in claim 130 wherein the at least one client expert datasource comprises data related to skills and knowledge of client experts.

132. The computer readable medium as in claim 130 wherein the at least one client expert datasource comprises data related to client expert devices.

133. The computer readable medium as in claim 131 further comprising program code adapted to select the at least one expert based on a comparison of the generated concept to the skills and knowledge of the client experts.

134. The computer readable medium as in claim 87 wherein the at least one expert comprises a client expert.

135. The computer readable medium as in claim 90 further comprising program code adapted to link the at least one client device with the at least one expert device using a telephony protocol.

136. The computer readable medium as in claim 135 wherein the telephony protocol comprises a protocol selected from the group consisting of POTS, ISDN, voice over Internet, ATM, frame relay, an analog protocol and a digital protocol.

137. The computer readable medium as in claim 136 wherein the analog protocol comprises a time domain multiplexed protocol.

138. The computer readable medium as in claim 136 wherein the digital protocol comprises a DCIU protocol.

139. The computer readable medium as in claim 90 further comprising program code adapted to link the at least one client device with the at least one expert device using an electronic mail protocol.

140. The computer readable medium as in claim 139 wherein the electronic mail protocol comprises a protocol selected from the group consisting of SMTP, SMTP/MIME, SMTP/PMSP, and SNMP.

141. The computer readable medium as in claim 139 wherein the electronic mail protocol comprises a protocol determined by an Open Systems Interconnect electronic messaging CCITT X.400 standard.

142. The computer readable medium as in claim 139 wherein the electronic mail protocol comprises a protocol determined by an Open Systems Interconnect electronic messaging CCITT X.500 standard.

143. The computer readable medium as in claim 139 wherein the electronic mail protocol comprises a protocol determined by an Open Systems Interconnect electronic messaging CCITT X.700 standard.

144. The computer readable medium as in claim 90 further comprising program code adapted to link the at least one client device with the at least one expert device using an Internet protocol.

145. The computer readable medium as in claim 144 wherein the Internet protocol comprises a protocol selected from the group consisting of TCP/IP, point-to-point, point-to-point tunneling and military standard TCP/IP.

146. The computer readable medium as in claim 144 wherein the Internet protocol comprises a protocol defined by the Internet Architecture Board, RFC2300.

147. The computer readable medium as in claim 90 further comprising program code adapted to link the at least one client device with the at least one expert device using a facsimile protocol.

148. The computer readable medium as in claim 147 wherein the facsimile protocol comprises a protocol selected from the group consisting of CCITTG3FAX, CCITTG4FAX, v.27ter, v.29, v.17, ITU-T, T.30, ITU-T, T.4, ITU-T, T.6, Kermit, and K56flex.

149. The computer readable medium as in claim 147 wherein the facsimile protocol comprises an Internet mail protocol.

150. The computer readable medium as in claim 149 wherein the Internet mail protocol comprises a protocol defined by a RFC 2305 standard.

151. The computer readable medium as in claim 147 wherein the facsimile protocol comprises a protocol defined by a MIME part, RFC 2159 standard, relating to facsimile.

152. The computer readable medium as in claim 90 further comprising program code adapted to link the at least one client device with the at least one expert device using a data communications protocol.

153. The computer readable medium as in claim 152 wherein the data communications protocol comprises a protocol selected from the group consisting of Ethernet, token ring, IBM-SNA-3270, IBM-SNA-5250, HDLC, BiSync, and an RS232 protocol.

154. The computer readable medium as in claim 152 wherein the data communications protocol comprises a modem protocol.

155. The computer readable medium as in claim 154 wherein the modem protocol comprises a protocol selected from a group consisting of v.21, v.22, v.22bis, v.23, v.25 and v.34.

156. The computer readable medium as in claim 90 further comprising program code adapted to link the at least one client device with the at least one expert device using a wireless communication protocol.

157. The computer readable medium as in claim 156 wherein the wireless protocol comprises a communication protocol selected from a group consisting of AMPS, TDMA, CDMA, composite CDMA/TDMA, CDPD, GMS, and PCS.

158. The computer readable medium as in claim 90 further comprising program code adapted to link the at least one client device with the at least one expert device beginning at a selected time.

159. The computer readable medium as in claim 87 wherein the at least one datasource and at least one expert datasource are a part of the same network.

160. The computer readable medium as in claim 159 wherein the network comprises a client network.

161. The computer readable medium as in claim 159 wherein the network comprises a private network.

162. The computer readable medium as in claim 159 wherein the network comprises a public network.

163. The computer readable medium as in claim 162 wherein a portion of the public network comprises a network selected from a group consisting of the Internet, an intranet or extranet.

164. The computer readable medium as in claim 87 wherein the at least one datasource and at least one expert datasource are a part of different networks.

165. The computer readable medium as in claim 90 wherein the at least one client device and the at least one expert device are a part of the same network.

166. The computer readable medium as in claim 165 wherein the network comprises a client network.

167. The computer readable medium as in claim 165 wherein the network comprises a private network.

168. The computer readable medium as in claim 165 wherein the network comprises a public network.

169. The computer readable medium as in claim 168 wherein a portion of the public network comprises a network selected from a group consisting of the Internet, an intranet or extranet.

170. The computer readable medium as in claim 90 wherein the at least one client device and the at least one expert device are a part of different networks.

171. The computer readable medium as in claim 87 further comprising program code adapted to generate at least one client question.

172. The computer readable medium as in claim 171 further comprising program code adapted to send the at least one client question to the at least one client.

173. The computer readable medium as in claim 172 further comprising program code adapted to select the at least one expert based on a focused concept derived from at least one client response to the at least one client question.

174. The computer readable medium as in claim 87 further comprising program code adapted to track the at least one client inquiry.

175. The computer readable medium as in claim 87 further comprising program code adapted to update the at least one expert datasource.

176. An electronic device for linking at least one client with at least one expert, the electronic device comprising a resource matching program, said electronic service being configured:
to generate at least one concept based on at least one client inquiry to at least one datasource;
to compare the at least one generated concept to at least one expert datasource;
to select at least one expert from the at least one expert datasource based on the comparison of the generated concept to the at least one expert datasource; and
to link the at least one expert to at least one client;
wherein the at least one client inquiry comprises at least one client inquiry entered in conjunction with a computerized search conducted by the client;
wherein the at least one client inquiry is monitored by an additional program separate from the resource matching program; and
wherein the additional program responsive to entry of a command by the client supplies information regarding the monitored at least one client inquiry to said resource matching program.

177. The electronic device as in claim 176 wherein the electronic device comprises a public network server.

178. The electronic device as in claim 176 wherein the electronic device comprises a private network server.

179. The electronic device as in claim 176 wherein the electronic device comprises a client network server.

180. The electronic device as in claim 176 wherein the electronic device comprises a communications server.

181. The electronic device as in claim 176 wherein the electronic device comprises a router.

182. The electronic device as in claim 176 wherein the electronic device comprises an IP router.

183. The electronic device as in claim 180 wherein the communications server comprises a server selected from the group consisting of a PBX, ACD, soft ACD, Centrex and central office switch.

184. The electronic device as in claim 176 wherein the electronic device comprises an Internet call center.

185. The electronic device as in claim 176 wherein said electronic device is further configured to compare the at least one client inquiry to the at least one datasource.

186. The electronic device as in claim 176 wherein said electronic device is further configured to select at least one preferred communication mode associated with the at least one expert.

187. The electronic device as in claim 176 wherein said electronic device is further configured to link at least one client device to at least one expert device associated with the at least one expert.

188. The electronic device as in claim 187 wherein said electronic device is further configured to link the at least one client device to the at least one expert device using a preferred communication mode.

189. The electronic device as in claim 176 wherein said electronic device is further configured to select the at least one expert based on a set of availability rules.

190. The electronic device as in claim 189 wherein the availability rules comprise rules selected from the group consisting of a most currently available expert, a most easily reachable expert, cost and location.

191. The electronic device as in claim 187 wherein the at least one client device comprises a computer terminal.

192. The electronic device as in claim 187 wherein the at least one client device comprises a wireless device.

193. The electronic device as in claim 192 wherein the wireless device comprises an infrared wireless device.

194. The electronic device as in claim 192 wherein the wireless device comprises an optical signaling, wireless device.

195. The electronic device as in claim 187 wherein the at least one client device comprises a telephone.

196. The electronic device as in claim 187 wherein the at least one client device comprises a softphone.

197. The electronic device as in claim 187 wherein the at least one client device comprises a facsimile machine.

198. The electronic device as in claim 187 wherein the at least one client device comprises a facsimile server.

199. The electronic device as in claim 187 wherein the at least one client device comprises a programmable PC card.

200. The electronic device as in claim 187 wherein the at least one client device comprises a personal communications device.

201. The electronic device as in claim 200 wherein the personal communications device comprises a communications pager adapted to display alpha-numeric characters.

202. The electronic device as in claim 187 wherein the at least one expert device comprises a computer terminal.

203. The electronic device as in claim 187 wherein the at least one expert device comprises a wireless device.

204. The electronic device as in claim 203 wherein the wireless device comprises an infrared wireless device.

205. The electronic device as in claim 203 wherein the wireless device comprises an optical signaling, wireless device.

206. The electronic device as in claim 187 wherein the at least one expert device comprises a telephone.

207. The electronic device as in claim 187 wherein the at least one expert device comprises a softphone.

208. The electronic device as in claim 187 wherein the at least one expert device comprises a facsimile machine.

209. The electronic device as in claim 187 wherein the at least one expert device comprises a facsimile server.

210. The electronic device as in claim 187 wherein the at least one expert device comprises a programmable PC card.

211. The electronic device as in claim 187 wherein the at least one expert device comprises a personal communications device.

212. The electronic device as in claim 211 wherein the personal communications device comprises a communications pager adapted to display alpha-numeric characters.

213. The electronic device as in claim 176 wherein the is generated using parallel processing.

214. The electronic device as in claim 213 wherein the is generated using pattern matching.

215. The electronic device as in claim 213 wherein the is generated using neural network processing.

216. The electronic device as in claim 176 wherein the at least one datasource comprises structured and unstructured data.

217. The electronic device as in claim 176 wherein the at least one datasource comprises structured or unstructured data.

218. The electronic device as in claim 176 wherein the at least one expert datasource comprises data related to skills and knowledge of experts.

219. The electronic device as in claim 176 wherein the at least one expert datasource comprises data related to expert devices.

220. The electronic device as in claim 176 wherein said electronic device is further configured to select at least one predetermined expert response based on a comparison of the generated concept to a list of frequently sought after concepts.

221. The electronic device as in claim 176 wherein said electronic device is further configured to update the at least one expert datasource.

222. The electronic device as in claim 221 wherein said electronic device is further configured to update skills and knowledge of the at least one expert.

223. The electronic device as in claim 176 wherein said electronic device is further configured to select the at least one expert based on a comparison of the generated concept to skills and knowledge of experts in the at least one expert datasource.

224. The electronic device as in claim 176 wherein the at least one expert datasource comprises at least one client expert datasource.

225. The electronic device as in claim 224 wherein the at least one client expert datasource comprises data related to skills and knowledge of client experts.

226. The electronic device as in claim 224 wherein the at least one client expert datasource comprises data related to client expert devices.

227. The electronic device as in claim 225 wherein said electronic device is further configured to select the at least one expert based on a comparison of the generated concept to the skills and knowledge of the client experts.

228. The electronic device as in claim 176 wherein the at least one expert comprises a client expert.

229. The electronic device as in claim 187 wherein said electronic device is further configured to link the at least one client device with the at least one expert device using a telephony protocol.

230. The electronic device as in claim 229 wherein the telephony protocol comprises a protocol selected from the group consisting of POTS, ISDN, voice over Internet, ATM, frame relay, an analog protocol and a digital protocol.

231. The electronic device as in claim 230 wherein the analog protocol comprises a time domain multiplexed protocol.

232. The electronic device as in claim 230 wherein the digital protocol comprises a DCIU protocol.

233. The electronic device as in claim 187 wherein said electronic device is further configured to link the at least one client device with the at least one expert device using an electronic mail protocol.

234. The electronic device as in claim 233 wherein the electronic mail protocol comprises a protocol selected from the group consisting of SMTP, SMTP/MIME, SMTP/PMSP, and SNMP.

235. The electronic device as in claim 233 wherein the electronic mail protocol comprises a protocol determined by an Open Systems Interconnect electronic messaging CCITT X.400 standard.

236. The electronic device as in claim 233 wherein the electronic mail protocol comprises a protocol determined by an Open Systems Interconnect electronic messaging CCITT X.500 standard.

237. The electronic device as in claim 233 wherein the electronic mail protocol comprises a protocol determined by an Open Systems Interconnect electronic messaging CCITT X.700 standard.

238. The electronic device as in claim 187 wherein said electronic device is further configured to link the at least one client device with the at least one device expert device using an Internet protocol.

239. The electronic device as in claim 238 wherein the Internet protocol comprises a protocol selected from the group consisting of TCP/IP, point-to-point, point-to-point tunneling and military standard TCP/IP.

240. The electronic device as in claim 238 wherein the Internet protocol comprises a protocol defined by the Internet Architecture Board, RFC2300.

241. The electronic device as in claim 187 wherein said electronic device is further configured to link the at least one client device with the at least one expert device using a facsimile protocol.

242. The electronic device as in claim 241 wherein the facsimile protocol comprises a protocol selected from the group consisting of CCITTG3FAX, CCITTG4FAX, v.27ter, v.29, v.17, ITU-T, T.30, ITU-T, T.4, ITU-T, T.6, Kermit, and K56flex.

243. The electronic device as in claim 241 wherein the facsimile protocol comprises an Internet mail protocol.

244. The electronic device as in claim 243 wherein the Internet mail protocol comprises a protocol defined by a RFC 2305 standard.

245. The electronic device as in claim 241 wherein the facsimile protocol comprises a protocol defined by a MIME part, RFC 2159 standard, relating to facsimile.

246. The electronic device as in claim 187 wherein said electronic device is further configured to link the at least one client device with the at least one expert device using a data communications protocol.

247. The electronic device as in claim 246 wherein the data communications protocol comprises a protocol selected from the group consisting of Ethernet, token ring, IBM-SNA-3270, IBM-SNA-5250, HDLC, BiSync, and an RS232 protocol.

248. The electronic device as in claim 246 wherein the data communications protocol comprises a modem protocol.

249. The electronic device as in claim 248 wherein the modem protocol comprises a protocol selected from a group consisting of v.21, v.22, v.22bis, v.23, v.25 and v.34.

250. The electronic device as in claim 187 wherein said electronic device is further configured to link the at least one client device with the at least one expert device using a wireless communication protocol.

251. The electronic device as in claim 250 wherein the wireless protocol comprises a communication protocol selected from a group consisting of AMPS, TDMA, CDMA, composite CDMA/TDMA, CDPD, GMS, and PCS.

252. The electronic device as in claim 187 wherein said electronic device is further configured to link the at least one client device with the at least one expert device beginning at a selected time.

253. The electronic device as in claim 176 wherein the at least one datasource and at least one expert datasource are a part of the same network.

254. The electronic device as in claim 253 wherein the network comprises a client network.

255. The electronic device as in claim 253 wherein the network comprises a private network.

256. The electronic device as in claim 253 wherein the network comprises a public network.

257. The electronic device as in claim 256 wherein a portion of the public network comprises a network selected from a group consisting of the Internet, an intranet or extranet.

258. The electronic device as in claim 176 wherein the at least one datasource and at least one expert datasource are part of different networks.

259. The electronic device as in claim 187 wherein the at least one client device and the at least one expert device are a part of the same network.

260. The electronic device as in claim 259 wherein the network comprises a client network.

261. The electronic device as in claim 259 wherein the network comprises a private network.

262. The electronic device as in claim 259 wherein the network comprises a public network.

263. The electronic device as in claim 262 wherein a portion of the public network comprises a network selected from a group consisting of the Internet, an intranet or extranet.

264. The electronic device as in claim 187 wherein the at least one client device and the at least one expert device are a part of different networks.

265. The electronic device as in claim 176 wherein said electronic device is further configured to generate at least one client question.

266. The electronic device as in claim 265 wherein said electronic device is further configured to send the at least one client question to at least one client.

267. The electronic device as in claim 266 wherein said electronic device is further configured to select at least one expert based on a focused concept derived from at least one client response to the at least one client question.

268. The electronic device as in claim 176 wherein said electronic device is further configured to track the at least one client inquiry.

269. The electronic device as in claim 176 wherein said electronic device is further configured to update the at least one expert datasource.

* * * * *

UNITED STATES PATENT AND TRADEMARK OFFICE
CERTIFICATE OF CORRECTION

PATENT NO. : 7,177,316 B1
APPLICATION NO. : 09/467240
DATED : February 13, 2007
INVENTOR(S) : Kenneth C. Pilecek Page 1 of 1

It is certified that error appears in the above-identified patent and that said Letters Patent is hereby corrected as shown below:

In the claims:

Claim 176, col. 17, line 42, please delete "service" and insert --device--.

Claim 213, col. 19, line 20, after "wherein the" please insert --at least one concept--.

Claim 214, col. 19, line 22, after "wherein the" please insert --at least one concept--.

Claim 215, col. 19, line 24, after "wherein the" please insert --at least one concept--.

Signed and Sealed this

Tenth Day of April, 2007

JON W. DUDAS
*Director of the United States Patent and Trademark Office*